UNITED STATES PATENT OFFICE.

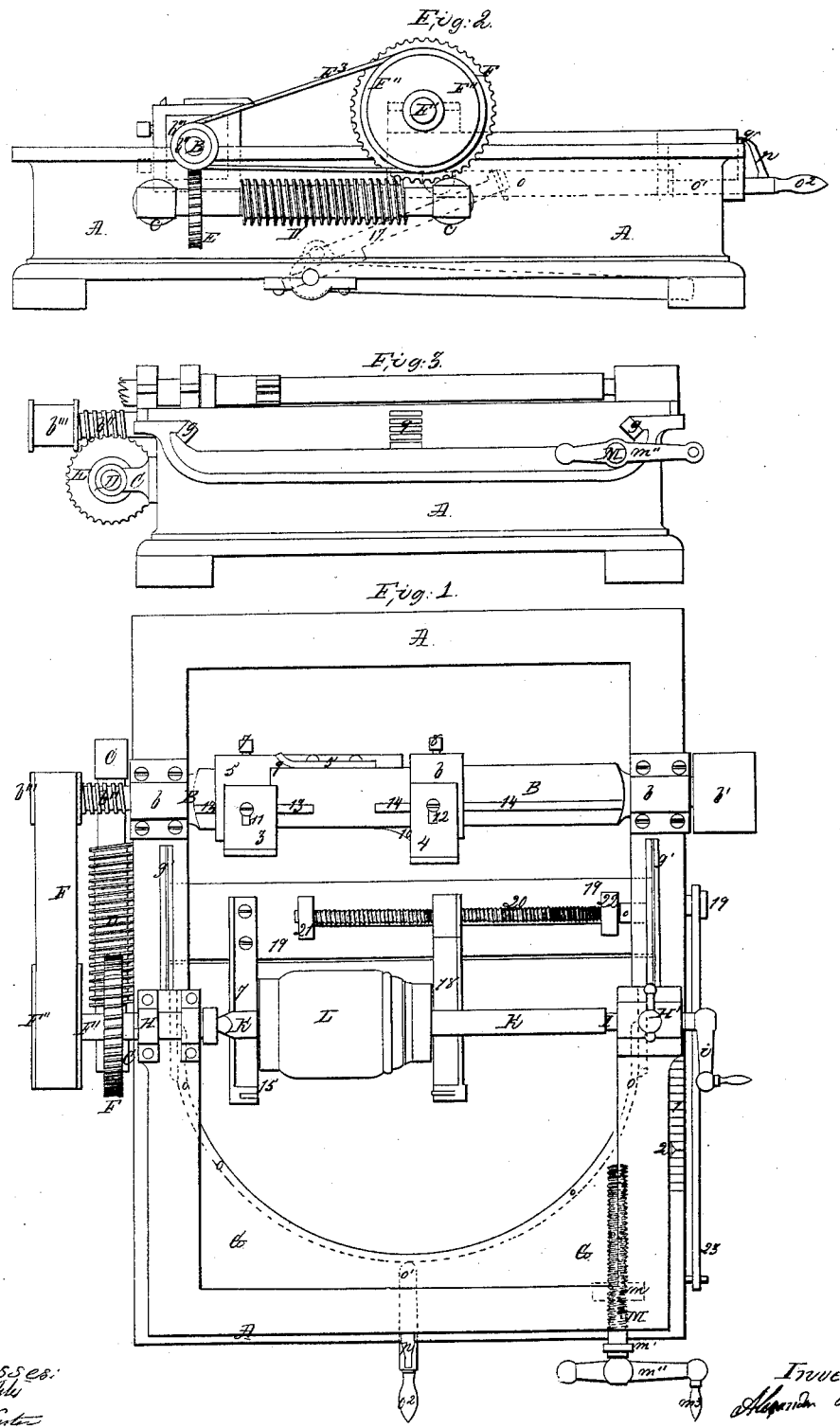

ALEXANDER RICKART, OF SCHOHARIE, NEW YORK.

MACHINE FOR TURNING HUBS.

Specification of Letters Patent No. 24,579, dated June 28, 1859.

*To all whom it may concern:*

Be it known that I, ALEXANDER RICKART, of Schoharie, in the county of Schoharie, in the State of New York, have invented new and useful Improvements in Hub-Machines, and that the following is a full and exact description of my said machine and the improvements thereon, reference being had to the drawings accompanying and making part of this specification.

In the drawings referred to Figure I, is a top view or plan of the machine. Fig. II, is a side elevation. Fig. III, is an end or front elevation.

In all the figures the same letters represent the same parts.

The machinery operates in a strong rectangular bed plate or frame A, A. Across the after part of the frame is hung the rotary shaft for carrying the cutters having its bearings upon the two sides of the frame at $b$, $b$, these bearings being accurately and firmly secured, to allow the shaft to revolve with very great rapidity and accuracy. The ends of this shaft are extended outside of the bed frame; and on the end, at the right is the driving pulley $b'$, and upon the opposite end is the screw $b''$ and again outside and contiguous to $b''$ is the pulley $b'''$.

Upon the exterior side of the bed frame and below the line of the shaft B, are the two parallel projecting brackets C, C, each having at its exterior end a bearing to receive the horizontal screw D, near one end of which is the worm-wheel E, geared into and operated by the screw $b''$ on shaft B, just described. The other end of screw D is geared into a worm wheel F at right angles to worm wheel E, for purposes to be hereafter described.

Upon the top of the bed frame in front of and independent of the cutter shaft, is placed the sliding table G, open in the middle, and having its sides projecting toward the bearings of the cutter shaft, the under surfaces of the table when they rest upon the sides of the bed frame being dovetailed as seen at $g$, $g$, and grooved to admit of a corresponding projection, on the ways by which the motion of the table is kept accurate and steady. In Fig. I, a part of these ways is seen at $q'$, $q'$.

Upon the sides of the sliding table G are placed the bearings and journal boxes H, H', the bearings at H being to receive the spindle F' of the worm wheel F; and the bearing at H' being for the short screw spindle or headstock I which works in a corresponding female screw in the bearing H' and is turned by handle $i$ inward or outward as required.

Into the ends of the spindles F', and I is inserted the hub mandrel K by a pivot and circular socket at I, and a square socket and end at the opposite extremity of the mandrel. The mandrel K is circular and uniform, to admit of the blank for the hub, when bored, to be slipped over it and fit it closely.

Upon the outer end of spindle F' is fast the pulley F'' which is geared to pulley $b'''$ (before described) by the connecting band $F^3$. Thus, when motion is given to the driving pulley $b'$ the cutter shaft and the hub mandrel will revolve in opposite directions, but the hub mandrel with a very greatly reduced speed of rotation, and it is intended to be in the ratio of about 4 to 1.

M is a horizontal screw working in a female screw or bearing $m$ fast to the under side of the sliding table. The screw M has also a bearing on the outside of the bed frame at $m'$ and is turned by the arm and handle $m''$, $m^3$.

By operating the screw, the sliding table and the parts above described carrying the hub blank, are pushed forward toward the cutter shaft, or withdrawn from it as required.

Upon the under side of the sliding table is placed a lever with curved arms, as is shown by the dotted lines (Fig. I) at $o$, $o$, the fulcrum of the two arms being near the ends in brackets projecting perpendicularly from the under surface of the side of the table: at the extreme ends of the arms which extend a short distance beyond the table on the upper side the ends turn up with sharp edges to catch into the under side of a projecting cornice.

The lever arms are fast to the horizontal lever bar O', which is extended and projects outside the bed frame as seen at $O^2$.

When the arm O' is forced downward it pushes the opposite ends of the lever up closely against the projecting cornice of the bed frame, and holds the carriage steady and firm so that it is not moved by the vibration of the cutter shaft and cutters. The arm O' is held down by a pawl $p$, attached to it, which catches in a rack upon the edge of the table at q. (Figs. II, III.) When the table is to be moved the pawl must be disengaged.

I have thus far described those parts of my machine which are shown in the model deposited upon the application for the Letters Patent herein before referred to, and intended to have been described in the specification of said Letters Patent.

I now proceed to describe those parts which are additions and improvements to my former machine.

Upon the upper surface of the side of the bed frame is placed the brass plate 1 (Fig. I,) and this plate divided by engraved lines into a scale adapted and adjusted to the diameters of the hubs required.

Upon the edge of the sliding table is placed the index 2; as this moves with the table, it will indicate to the operator when it reaches the designated part of the scale, that the hub is reduced by the cutters to the required size.

The cutter shaft B, (before described) is square between the journals and carries upon it the cutters three of which are shown in the drawing at 3, 4, 5 (Fig. I) arranged and their cutting edges shaped so as to cut the blank into a hub of the form and pattern desired.

Instead of fastening all the cutters to the shaft I fasten three of them to two metallic sleeves made to fit the shaft and slide upon it. These sleeves are of a peculiar, and I believe in some features, of a novel construction. It is evident that in cutting the different parts of the surface of the hub by one operation, as is done in my machine, the knives or cutters must be of different sizes or lengths, and consequently of different weights. Thus, the knife that cuts the body or swell of the hub, is longer and heavier than that which cuts the band surface; and this last is heavier than that which cuts the molding or bead part of the surface of the hub. These knives are placed to correspond with the four sides of the rotary shaft, and of course the side which has on it the heaviest knife will overbalance the other sides, and will require a counterpoise, to render the extreme speed of the shaft either safe, or sufficiently steady to produce a smooth surface of the hub. To balance the rotary shaft, it has been common heretofore, to take it out of its bearings, and lay it with its journals resting upon thin or sharp edges, so as that the slightest preponderance in weight on either side, would turn it; and to obtain an equipose by experimental weights, or screw bolts, screwed into or fastened upon the faces of the shaft until it would balance. This practice requires time and great care, and before my present improvement, more time was often spent by me in balancing the shaft, at every change of knife, than was required to cut and finish the hubs. The sleeves are constructed, in part, to obviate this difficulty, although they answer other important purposes hereafter to be described. The sleeves are two in number, and each of them carries a band and molding cutter, and no other cutter. The cutters belonging to the sleeves are placed upon the different sides of the sleeves, corresponding to the sides of the shaft, so as to balance as near as may be, their own weight. Between the two sleeves, and directly upon the face of the rotary shaft, is placed the large knife or cutter which cuts and finishes the body or swell of the hub; and this knife being larger in comparison with the other knives, throws the shaft out of balance. Now, to effect an uniform equipoise of the shaft, (whether cutting larger or smaller hubs) which shall not require adjustment, that side of the sleeve which is on the side of the shaft opposite the large knife, is cast of such increased thickness and weight, as always to balance or equipoise the weight of the knife; and the result of this continuance, so far as concerns the balancing the shafts, is that it is always at an equipoise. Again: one of the sleeves (and of course the cutters attached) is always at a fixed point upon the shaft; while the other sleeve and cutters attached slide upon the shaft so as to approach to or recede from the first mentioned stationary sleeve; and by this means to cut and finish any sized hub without change of cutters. Now this sleeve, if a new band of the ordinary construction could not thus slide upon the shaft, because it would come in contact with the large intermediate knife, before mentioned, unless the knife were made in sections, or parts to be removed and replaced, which would be very inconvenient. To effect the desired object, therefore, this sliding sleeve is made with an opening or break at the angle so as to slide over and upon the large knife, without interfering with it, and it also covers or masks that part of the large knife, not required for cutting, as is the case when a smaller sized hub is being cut. By this device, as above described, not only is the shaft always equipped, but no change of knives is required whatever may be the size of hub to be cut. These sleeves are shown at 5, 6, in position upon the shaft;—they are adjustable upon the shaft and held in place by the set screws 7, 8. Upon two sides, their inner edges are flanges as seen at 9, 10, and the surface of the flanges is curved to correspond with the cutters, which are fastened upon or contiguous to them. The cutters which are fastened to the sleeves are adjustable outward or inward by the set screws, and slots 11—12— and the screws pass through the sleeves; the shaft underneath the screws is grooved to admit the sliding of the screws along them, without chafing:—the grooves are shown at 13—14. These sleeves thus constructed admit of the utmost accuracy in the lateral adjustment of the cutters and they form knife or cutter stocks to strengthen and support the cutters fastened to them, and also to those which are contiguous to the curved flanges.

From the foregoing description, it is evident that the motion of the cutter shaft will be communicated to the hub mandrel through the screw D only when screw D is in gear with the worm wheel F. Now as the worm wheel F is attached to the sliding table, it follows that when the sliding table is drawn back it will disconnect F from D; and also that it will tighten the belt F³ (before loose and inoperative) so as to connect the cutter shaft and hub mandrel through the pulleys F″, 6‴, over which the belt passes, thereby giving to the mandrel and hub the speed of the cutter shaft; this device is for the purpose of cutting off the ends of the hubs, which is done by two cutters 15—16, in cutter stocks at the ends of two arms 17—18— the opposite end of one of which is fast to a vibrating bar 19, placed transversely across the lower part of the bed frame; the opposite end of the other arm works and traverses upon an adjusting screw 20, having its bearings 21—22, upon the vibrating bar and secured by a screw bolt through a slot in the vibrating bar 19, and is turned by a bar inserted in a socket at the end, made to adjust and set arm 18 and the knife it carries to any point.

When the machine is operated, the driving pulley being put in motion, the operator having fixed his sockets the required diameter of the hubs and placed his blank upon the mandrel, moves the sliding table up to the cutters by turning screw M, and when the periphery of the hub is finished, he reverses the operation of the screw table, and draws the sliding table back until screw D, and worm wheel F are disconnected, and the belt F³ is tightened, when speed is communicated to the hub mandrel; when, by raising the side arm 23, which is fast to 19, the arms 17, 18, and the cutters attached will instantly trim off the ends of the hub, which is thus completed, and then removed from the mandrel, to give place to another blank; and the operation is again repeated.

Having thus described my machine, what I claim as my invention in the said additions and improvements, and for which I desire Letters Patent, is—

1. The graduated scale 1, in combination with the index 2, and the sliding frame and hub blank and mandrel, operating in connection with the cutters in the manner and for the purpose described.

2. I am aware that slides or sleeves are in use; and that the making a rotary shaft to balance is not only common, but indispensable, when extreme speed is required; and I make no claim to sleeves, nor to balancing the shaft in themselves; but I claim as my invention and improvement the constructing the sliding sleeve with an opening at the angle so as to slide over and upon the large cutter on the shaft, so as to cut any required size of hub without change of knife, as described, and I claim the constructing the sliding sleeve (or cutter stock) to pass over and mask the fixed knife on the shaft, in connection and combination with the making one of the sides of the sleeve thicker and heavier than the others, in order to approximate to an equipoise of the shaft.

3. I claim the setting and adjusting (by means of the slot and screw bolt in 19) the arm 18, so as to cut any required length of hub, and so arranged upon the bar 19 as to allow it to vibrate for the purpose of bringing up the cutters to the hub, or throwing them back when required, and without interfering with the screw or the adjustment of the arm.

ALEXANDER RICKART.

Witnesses:
I. B. STAPLES,
WM. WINTER.